United States Patent
Murakami et al.

(10) Patent No.: US 8,064,105 B2
(45) Date of Patent: *Nov. 22, 2011

(54) IMAGE SCANNING DEVICE AND IMAGE FORMING DEVICE

(75) Inventors: Ayumu Murakami, Abiko (JP); Shoko Magata, Toride (JP); Takeshi Aoyama, Abiko (JP); Yuichi Yamamoto, Toride (JP); Takayuki Suga, Toride (JP); Haruhisa Oshida, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

This patent is subject to a terminal disclaimer.

(21) Appl. No.: 12/352,910

(22) Filed: Jan. 13, 2009

(65) Prior Publication Data

US 2009/0122367 A1 May 14, 2009

Related U.S. Application Data (63) Continuation of application No. 11/313,831, filed on Dec. 22, 2005, now Pat. No. 7,515,312.

(30) Foreign Application Priority Data

Dec. 24, 2004 (JP) ................................. 2004-374573

(51) Int. Cl.
*H04N 1/04* (2006.01)
*H04N 1/40* (2006.01)

(52) U.S. Cl. ........ 358/461; 358/496; 358/498; 358/497; 358/408

(58) Field of Classification Search .................. 358/461, 358/496, 498, 497, 408, 486, 406, 474, 504, 358/505; 382/274, 312, 318, 319; 399/374, 399/367, 364; 355/23, 24
See application file for complete search history.

(56) References Cited

U.S. PATENT DOCUMENTS

| | | | |
|---|---|---|---|
| 6,323,933 B1 | 11/2001 | Anzai | 355/23 |
| 6,967,749 B2 | 11/2005 | Chen | 358/406 |
| 7,379,216 B2 | 5/2008 | Yang | 358/461 |
| 7,515,312 B2 * | 4/2009 | Murakami et al. | 358/461 |
| 7,619,785 B2 * | 11/2009 | Sodeura et al. | 358/474 |
| 2004/0021913 A1 | 2/2004 | Aoyama et al. | 358/474 |
| 2004/0066544 A1 | 4/2004 | Suga et al. | 358/509 |
| 2004/0105133 A1 | 6/2004 | Murakami | 358/474 |
| 2004/0179242 A1 | 9/2004 | Nakaya | 358/461 |
| 2005/0179959 A1 | 8/2005 | Lien | 358/406 |
| 2005/0243382 A1 | 11/2005 | Wang | 358/461 |
| 2006/0197997 A1 | 9/2006 | Oshida et al. | 358/498 |
| 2006/0227389 A1 | 10/2006 | Yamamoto et al. | 358/496 |

(Continued)

FOREIGN PATENT DOCUMENTS

JP 4-371072 12/1992

(Continued)

*Primary Examiner* — Cheukfan Lee
(74) *Attorney, Agent, or Firm* — Fitzpatrick, Cella, Harper & Scinto

(57) ABSTRACT

An image scanning device including: a conveyance path which conveys originals; a first scanning means and a second scanning means which are placed such that they sandwich the conveyance path; and a white reference member used for adjusting the white levels of the scanning means; wherein at least one of the first scanning means, the second scanning means and the white reference member is movable; the first scanning means and the second scanning means can scan the same surface of said white reference member since the first scanning means or the second scanning means is moved or the white reference member is moved.

11 Claims, 9 Drawing Sheets

U.S. PATENT DOCUMENTS

2006/0250065 A1    11/2006    Lee et al. ...................... 313/113
2008/0137107 A1     6/2008    Futami ........................... 358/1.4

FOREIGN PATENT DOCUMENTS

| JP | 5-83480     | 4/1993  |
| JP | 2000-59621  | 2/2000  |
| JP | 2002-290685 | 10/2002 |
| JP | 2002-335380 | 11/2002 |
| JP | 2004-4188   | 1/2004  |

* cited by examiner

IMAGE SCANNING DEVICE AND IMAGE FORMING DEVICE

RELATED APPLICATIONS

This application is a continuation of co-pending U.S. patent application Ser. No. 11/313,831, filed Dec. 22, 2005 (now allowed), which is incorporated by reference herein in its entirety, as if fully set forth herein, and claims the benefit of priority under 35 U.S.C. §119, based on Japanese Priority Application No. JP 2004-374573, filed Dec. 24, 2004, which is incorporated by reference herein in its entirety, as if fully set forth herein.

BACKGROUND OF THE INVENTION

1. Field of the Invention

The present invention relates to image scanning devices capable of scanning images on the both surfaces of an original and, more particularly, to image scanning devices capable of reducing the white level difference between the surface and the back surface and correcting the density difference in order to prevent the occurrence of scanning density differences between the both sides.

2. Description of the Related Art

Conventionally, there have been suggested and provided various types of image scanning devices capable of concurrently scanning images on the both surfaces of an original while conveying the original. Among them, there have been suggested sheet-feeding type image scanning devices including scanning means fixedly provided at the both sides of an original conveyance path and also there have been suggested image scanning devices configured to include a flat-bed type original conveying device which enables scanning non-conveyable originals such as brochures and also include a back-surface scanning means placed within the original conveying device, as described in Japanese Patent Application Laid-open (JP-A) No. 5-83480.

Figure 8:
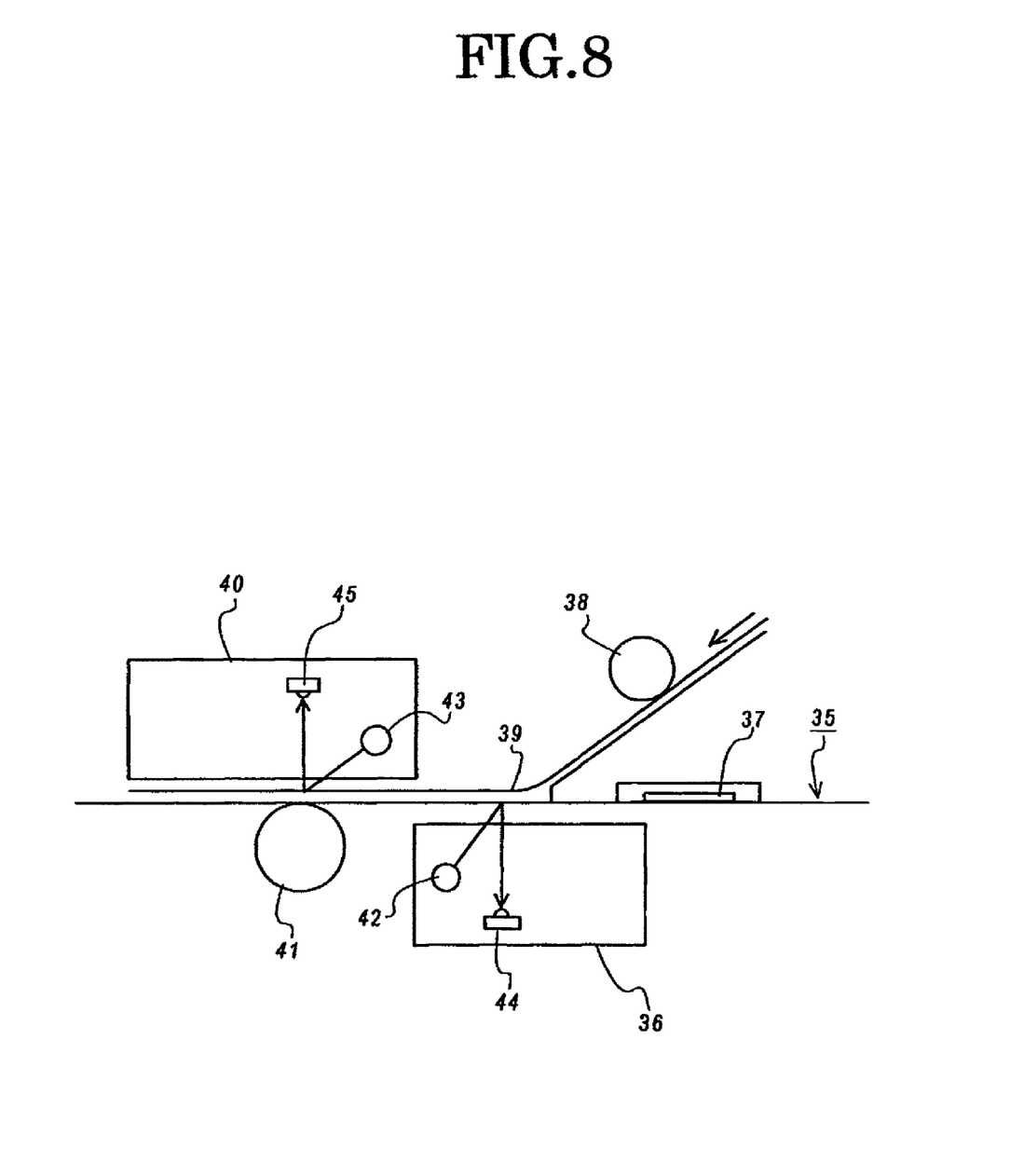
FIG. 8 is a main part explanation view illustrating the scanning mechanism part of a conventional image scanning device.
Figure 9:
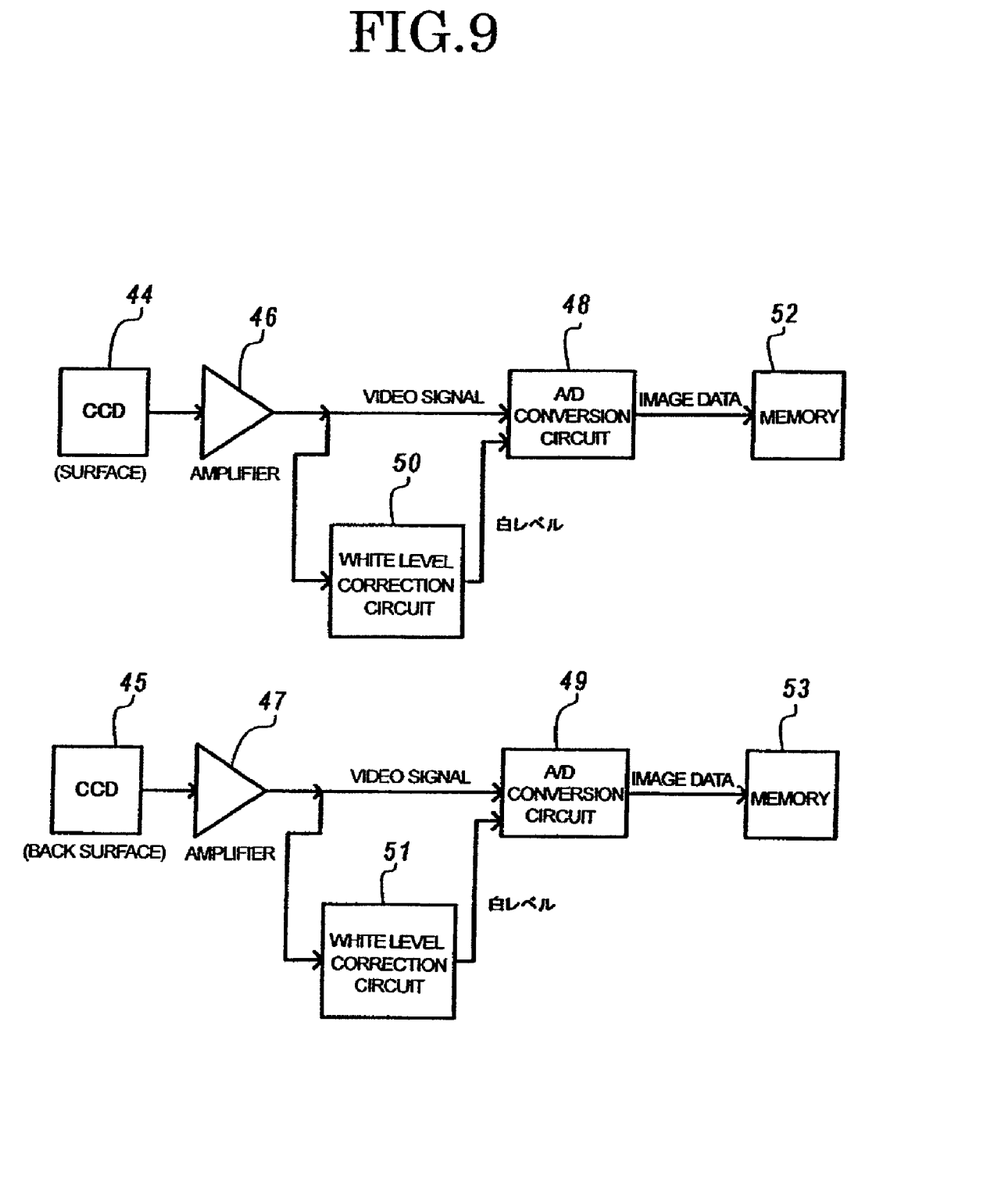
FIG. 9 is a view illustrating an image-signal processing circuit.

A conventional image scanning device capable of scanning the both surfaces of an original will be described using FIG. 8 and FIG. 9. FIG. 8 is a main part explanation view illustrating the scanning mechanism part of a conventional image scanning device and FIG. 9 is a view illustrating an image-signal processing circuit.

The image scanning device illustrated in FIG. 8 is for scanning the both surfaces of originals 39 and includes optical scanning units 36 and 40 which are placed such that they sandwich an original conveyance path. In the figure, the lower surface of the original 36 is referred to as a surface and the upper surface thereof is referred to as the back surface. A feeding roller 38 for conveying originals 39 is used for successive scanning of originals 39 or double-surface scanning.

The optical scanning unit 36 is a scanning means for scaring the surfaces of originals 39 and is movable within a flat bed part 35. The optical scanning unit 36 can scan an original secured on a platen glass by moving and also can scan an original being conveyed at a standstill state. The optical scanning unit 36 includes a lamp 42 and a CCD 44. Further, on the flat bed part 35, there is provided a white reference plate 37 for the optical scanning unit 36.

The optical scanning unit 40 is a scanning means for scanning the back surface of an original 39 and is fixedly placed within the original conveying device. The optical scanning unit 40 includes a lamp 43 and a CCD 45. At a position facing to the optical scanning unit 40, there is placed a platen roller 41 for the optical scanning unit 40, the platen roller 41 being also used as a white reference.

During double-surface scanning operations, the optical scanning unit 36 for surface scanning moves to the white reference plate 37 and scans the white reference plate 37 for adjusting the white level thereof and then it is moved to a usual scanning position (the illustrated position) and stopped. The optical scanning unit 40 for back-surface scanning scans a white reference on the platen roller 41 for adjusting the white level thereof and then waits an original 39 being conveyed thereto.

The originals 39 are successively fed to the original conveyance path through the feeding roller 38. Then, in the respective optical scanning units 36 and 40, the originals 39 are irradiated with the lamps 42 and 43 at their to-be-scanned regions on the surface and the back surface and are scanned by the CCDs 44 and 45.

As in the image-signal processing circuit illustrated in FIG. 9, the CCDs 44 and 45 are connected to amplifiers 46 and 47, A/D conversion circuits 48 and 49, white-level correction circuits 50 and 51, and memories 52 and 53, respectively. The white levels of the white references which are first scanned by the surface scanning CCD 44 and the back-surface scanning CCD 45 are respectively stored in the white-level correcting circuits 50 and 51 and are corrected according to the ground colors of originals which are subsequently scanned. The corrected white levels are output to the A/D conversion circuits 48 and 49. The A/D conversion circuits 48 and 49 convert analog image signals (video signals) received from the CCDs 44 and 45 through the amplifiers 46 and 47 into image data with corresponding density levels, by setting the white levels supplied from the white level correcting circuits 50 and 51 to the density saturation values. Thus, images on the surface and the back surface of the original are scanned with a proper contrast and then stored in the memories 52 and 53.

As described above, in a conventional double-surface image scanning device, a surface-scanning optical scanning unit and a back-surface-scanning optical scanning unit create white levels using specific white references such as a white reference plate and a platen roller.

However, (1) in the case where the respective white references are made of different materials, there is a reflectivity difference there between. (2) Even when the respective white references are made of the same material, the individual components cause density variations. (3) Along with the conveyance of originals, the difference in the degree of contaminations between the white references is advanced. In this case, the surface white reference plate 37 is not contaminated while the platen roller 41 which is the back-surface white reference is contaminated at its surface along with conveyance of originals.

For these reasons, the white reference levels of the optical scanning units 36 and 40 may not be in agreement with each other, thereby causing density differences among scanned image data. Consequently, there has been a need for performing burdensome level adjustments. Particularly, in the case of color scanning, the reflectivity differences on the respective color constituent basis (RGB) will cause color differences in scanned images and, therefore, it has been necessary to perform, for the respective white reference members, complicated controls, such as measuring the reflectivities of the respective RGB constituents and setting the white reference levels based on the reflectivities, for the respective components.

Further, JP-A No. 4-371072 discloses a configuration which scans images on the surface and the back surface of a prepared white reference test chart and adjusts the levels such that the scanned values obtained from the surface and the back surface are in agreement with each other. However, this configuration can overcome the aforementioned problems (1) and (2), but can not address the problem (3). Further, there is a need for preparing a sheet for adjustment, thereby causing the problems of cost increases and the necessity of adjusting operations.

Further, JP-A No. 2002-290685 and JP-A No. 2002-335380 disclose configurations in which a surface-scanning optical scanning unit and a back-surface-scanning optical scanning unit scan a single white reference member to perform white level correction. However, even though a single white reference member is used for white level correction, the surface-scanning optical scanning unit and the back-surface scanning optical scanning unit scan different regions, thereby causing the problem of impossibility of proper white level correction.

SUMMARY OF THE INVENTION

Therefore, it is an object of the present invention to provide an image scanning device capable of preventing the occurrence of density differences due to deviations of white-level adjustment during scanning the both sides of an original, with a simple structure without involving an increase of the cost.

In order to overcome the aforementioned problem, a representative structure of an image scanning device according to the present invention includes: a conveyance path which conveys originals; a first scanning means and a second scanning means which are placed such that they sandwich the conveyance path; and a white reference member used for adjusting the white levels of the scanning means; wherein at least one of the first scanning means, the second scanning means and the white reference member is movable, and the first scanning means and the second scanning means can scan the same surface of said white reference member since the first scanning means or the second scanning means is moved or the white reference member is moved.

DESCRIPTION OF THE PREFERRED EMBODIMENTS

First Embodiment

Figure 1:
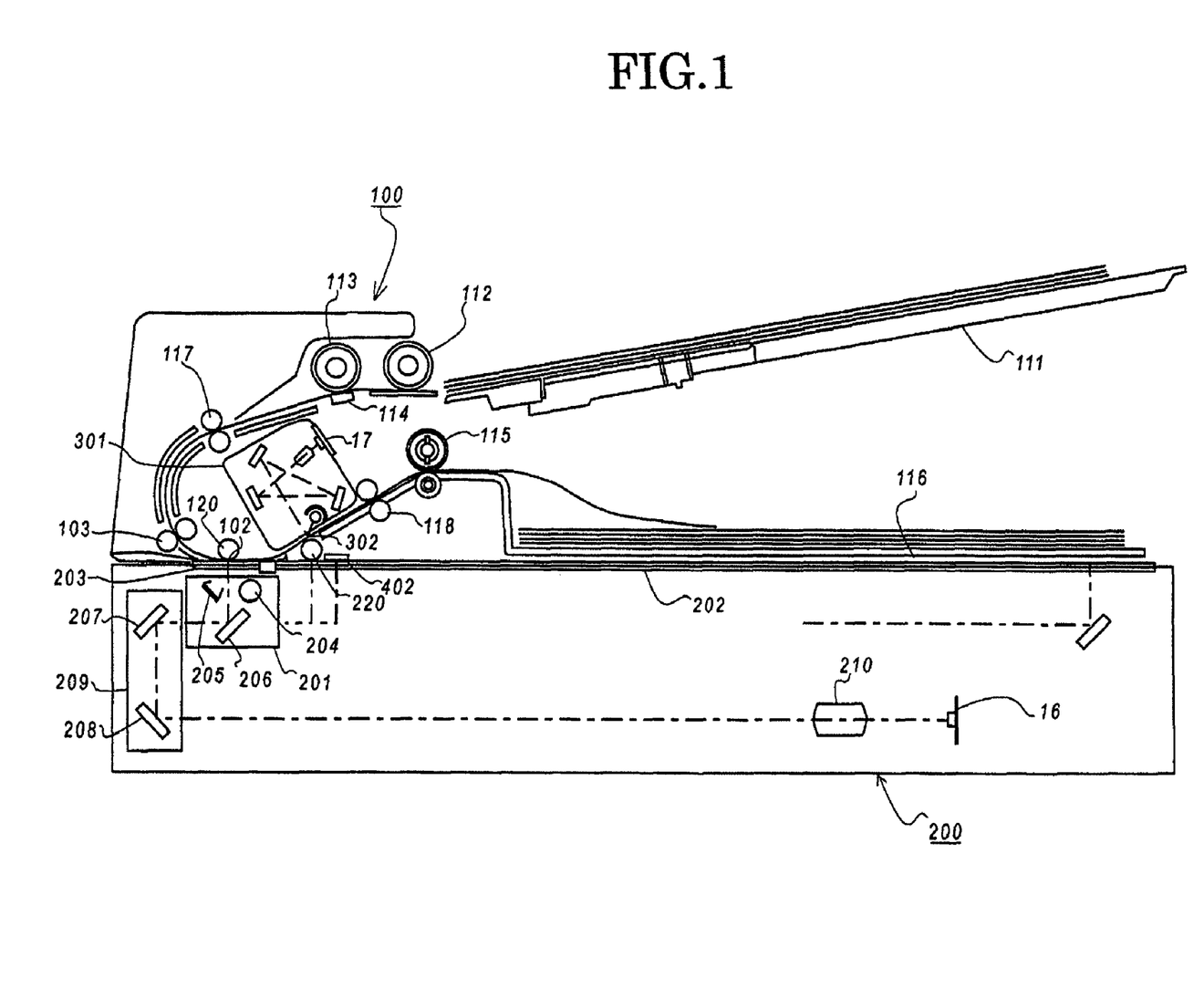
FIG. 1 is a general structural view of an image scanning device.
Figure 2:
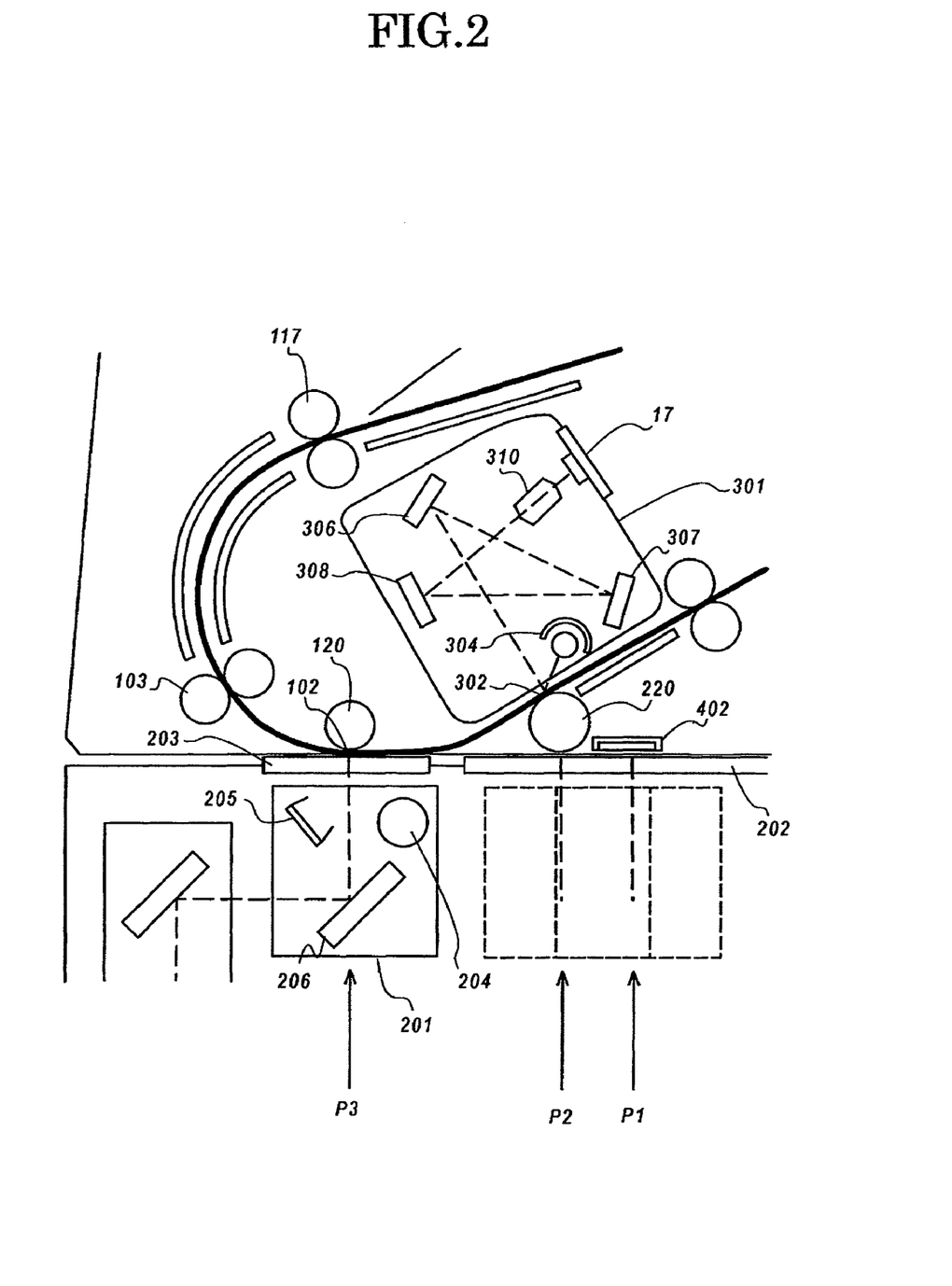
FIG. 2 is a main part enlarged view of the scanning part.
Figure 3:
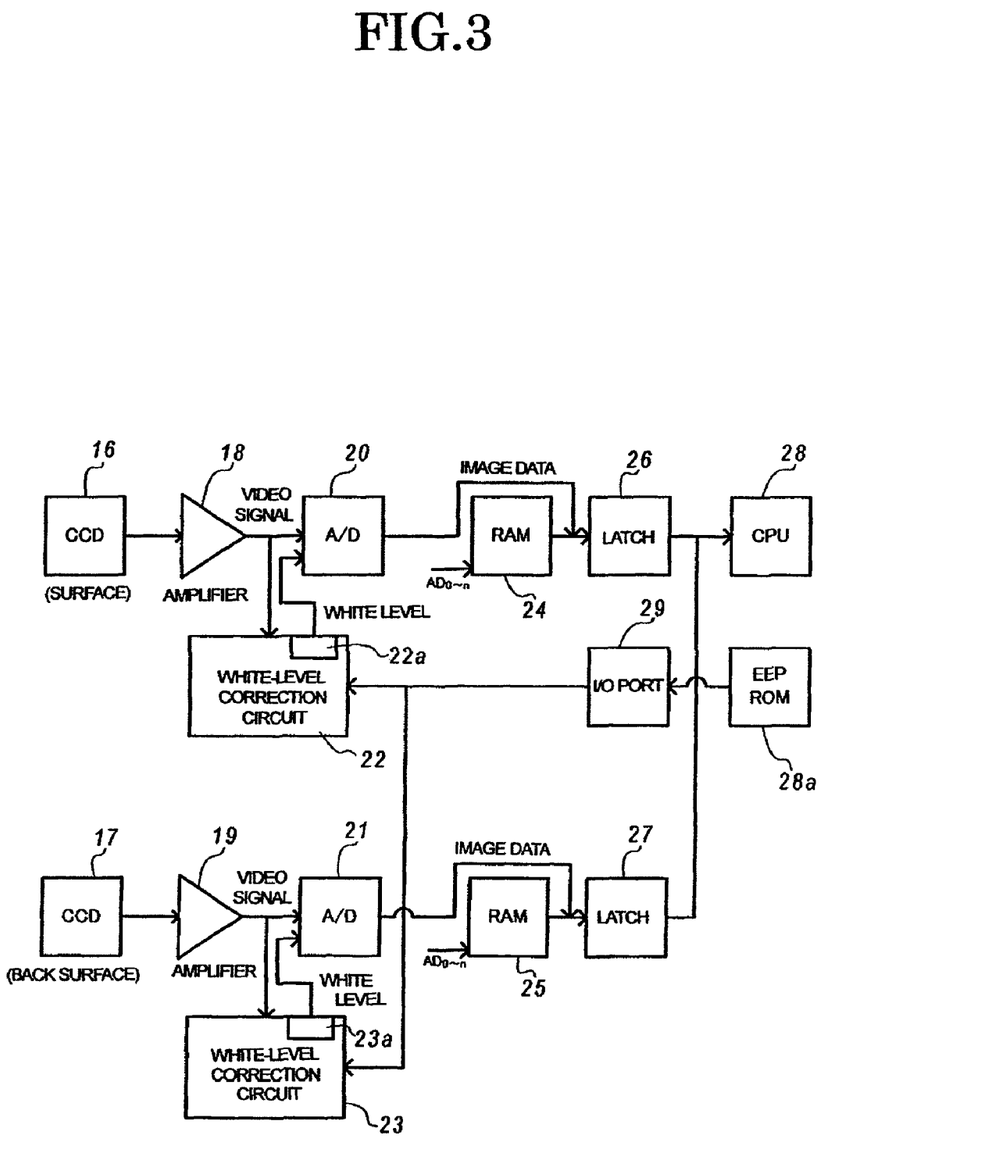
FIG. 3 is a view illustrating the structure of an image-signal processing circuit.
Figure 4:
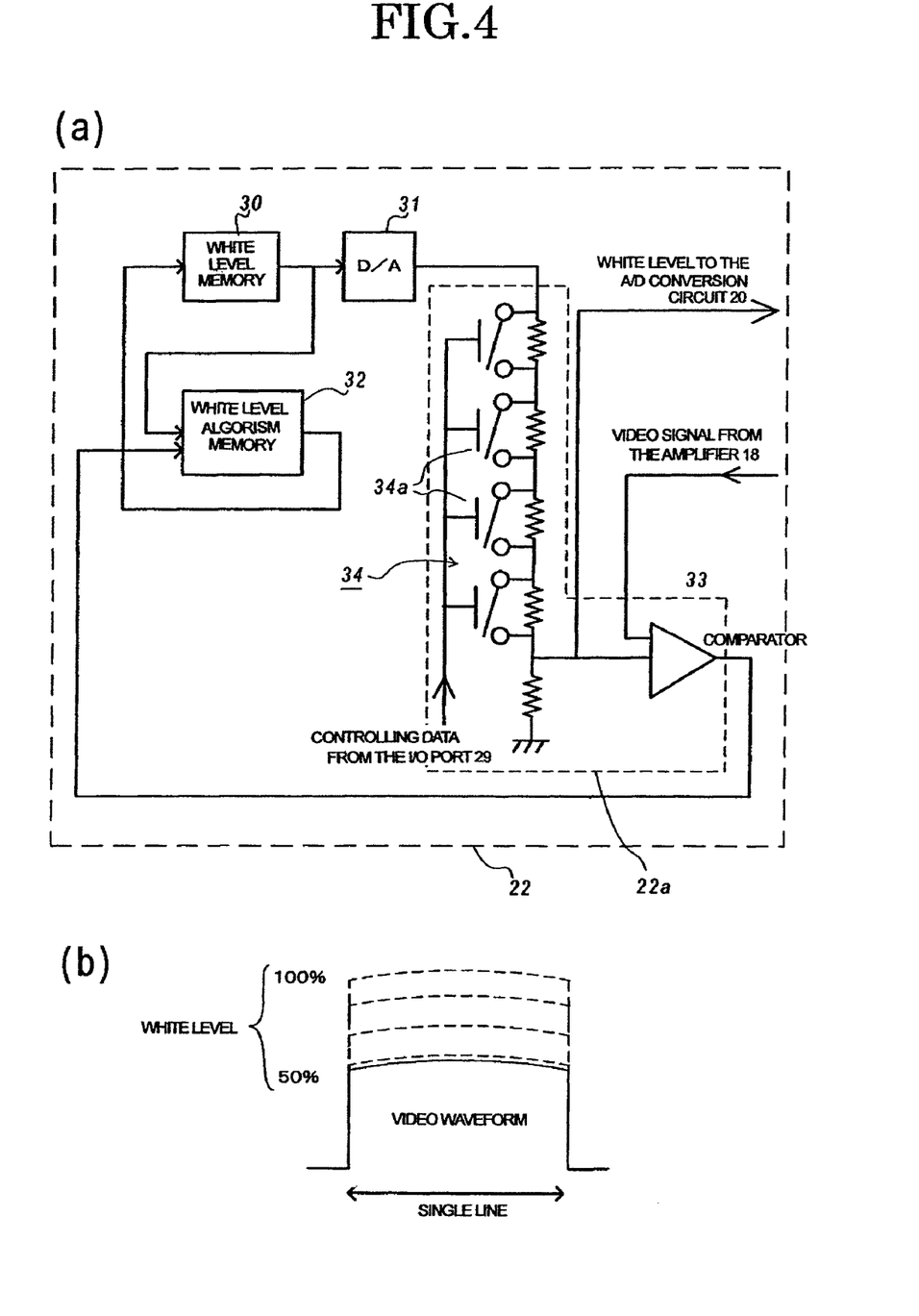
FIG. 4A is a view illustrating the detailed structures of a white-level correcting circuit and a level-variable circuit.
FIG. 4B is a view illustrating the detailed structures of a white-level correcting circuit and a level-variable circuit.
Figure 5:
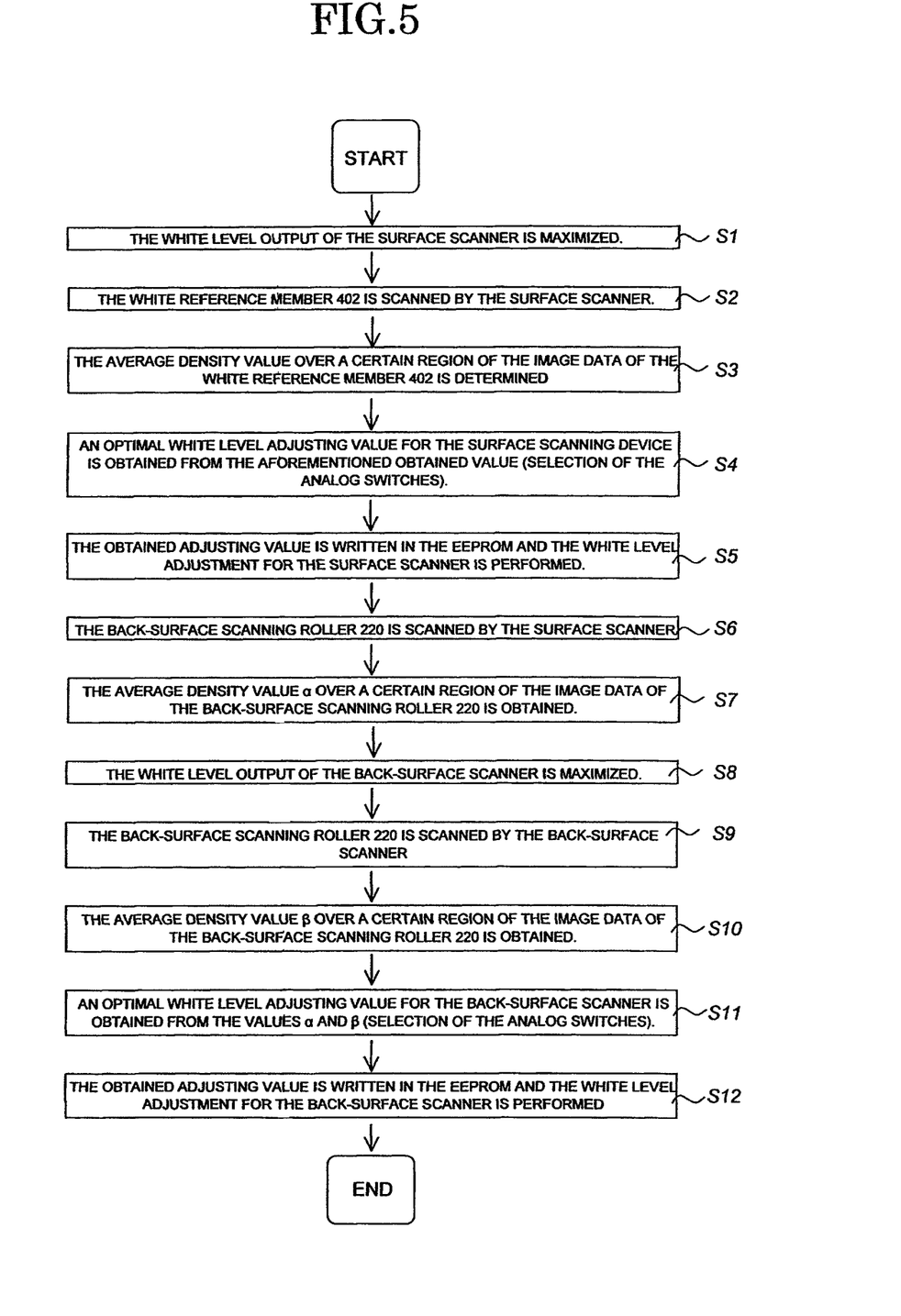
FIG. 5 is a flow chart explaining a process for creating white-level controlling data.

There will be described an image scanning device according to a first embodiment of the present invention. FIG. 1 is a general structural view of the image scanning device. FIG. 2 is a main part enlarged view of the scanning part. FIG. 3 is a view illustrating the structure of an image-signal processing circuit FIG. 4A is a view illustrating the detailed structures of a white-level correcting circuit and a level-variable circuit. FIG. 5 is a flow chart explaining a process for creating white-level controlling data. In the present embodiment in the drawings, the lower surface of an original during image scanning is referred to as an original surface while the upper surface thereof is referred to as an original back surface.

The image scanning device illustrated in FIG. 1 is constituted by an automated original feeding device (hereinafter, referred to as an ADF 100) and a scanning device main body 200. The scanning device main body 200 has a first scanning mode for scanning an image by moving a surface scanner 201 (first scanning means) while placing an original on a platen glass 202 of the scanning device main body 200. Further, the scanning device main body 200 has a second scanning mode for scanning an image on an original being transferred by the ADF 100 while maintaining the surface scanner 201 standstill at a predetermined position. In the second scanning mode, it is possible to scan the surface of an original by the surface scanner 201 while scanning the original back surface by a back-surface scanner (second scanning means) 301 fixedly placed in the ADF 100.

The scanning device main body 200 includes, at the upper surface thereof, a platen glass 202 for mounting an original thereon in the first scanning mode and a platen glass 203 for scanning an image on an original being conveyed in the second scanning mode. The scanning device main body 200 includes, inside thereof, the surface scanner 201 including a lamp 204, a reflection capping 205 and a minor 206, a two-mirror unit 209 having mirrors 207 and 208, a lens unit 210 and a CCD 16. Inage information optically scanned by the CCD 16 is photoelectrically converted into image data and then the image data is input. In the first scanning mode, the surface scanner 201 scans an image while moving along the platen glass 202 and, in the second scanning mode, it scans an image while being maintained standstill at a position facing to the platen glass 203.

At a position which can be scanned by the surface scanner 201 through the platen glass 202, there is provided a white reference member 402 (standard white reference member) used for adjusting the white level of the surface scanner 201.

The ADF 100 includes a sheet tray 111 as an original mounting table, and originals on the sheet tray 111 are fed therefrom in order from an uppermost original through a feeding roller 112 as a feeding means. Then, the originals fed therefrom are separated into individual originals through a separation feeding roller 113 and a separation pad 114 which constitute a separating means. The separated originals are conveyed to the platen glass 203 of the scanning device main body 200 through a pair of conveyance rollers 117 and a pair of upstream lead rollers 103.

Before entering the platen glass 203, the originals are butted against the nip portions of the pair of upstream lead rollers 103 at their tip ends to form a loop, thereby correcting the skew feeding and adjusting the timing. Thereafter, the originals are passed by a back-surface scanner 301 and then discharged onto a discharge tray 116 through a pair of downstream lead rollers and a pair of discharge rollers 115.

As illustrated in FIG. 2, the back-surface scanner 301 is placed at the opposite side to the surface scanner 201 as a first scanning means with respect to the conveyance path and is configured to scan images on the back surfaces of originals. The back-surface scanner 301 includes a lamp 304, mirrors 306, 307 and 308, a lens unit 310, and a CCD 17. The back-surface scanner 301 optically scans image information recorded on to-be-scanned originals, photoelectrically converts it into image data and then inputs the image data.

As illustrated in FIG. 2, the position of the platen glass 203 at which images can be scanned by the surface scanner 201 is referred to as a surface scanning position 102 and the position at which images can be scanned by the back-surface scanner 301 is referred to as a back-surface scanning position 302. These are scanning positions in the aforementioned second scanning mode.

At the surface scanning position 102, there is provided a surface scanning roller 120 for pressing an original being conveyed there through against the platen glass 203, at a position facing to the surface scanner 201 through the platen glass 203 and the original conveyance path. The surface scanning roller 120 has a white color, in order not to exert influences on to-be-scanned images. However, in the present embodiment, the surface scanning roller 120 is not utilized as a white reference.

At the back-surface scanning position 302, there is provided a back-surface scanning roller 220 for pressing an original being transferred there through against the back-surface scanner 301, at a position facing to the back-surface scanner 301 through the original conveyance path. The back-surface scanning roller 220 has a white color and is utilized as a white reference, in the present embodiment.

The structure of the image-signal processing circuit will be described based on FIG. 3. In FIG. 3, the upper circuit part including the CCD 116 is used for scanning surfaces while the lower circuit part including the CCD 117 is used for scanning the back surfaces.

Video signals output from the CCDs 116 and 117 are amplified by amplifiers 18 and 19 and then input to the white-level correction circuits 22 and 23 and A/D conversion circuits 20 and 21. The white-level correction circuits 22 and 23 detect the ground-color levels of input video signals, correct the current white levels with a predetermined ratio and then supply them to the A/D conversion circuits 20 and 21 through level-variable circuits 22a and 23a. The A/D conversion circuits 20 and 21 convert the input video signals into image data of digital signals by setting the white level values to the density saturation values (dynamic range values). The image data is stored in sequential addresses in RAMs 24 and 25. The addresses are designated as AD0 to ADn having n+1 bits.

Latches 26 and 27 are state latches, which are interrupted during writing of image data into the RAMs 24 and 25. A CPU 28 executes a controlling program stored in an EEPROM 28a to control the image scanning operation, white-level variation adjusting processes and the like. Controlling data resulted from the calculations is stored in the EEPROM 28a. Further, the CPU 28 controls the respective level-variable circuits 22a and 23a through an I/O port 29 to adjust the white levels.

FIG. 4A is a view illustrating the detailed structures of the white-level correction circuit 22 and the level variable circuit 22a of FIG. 3 which are enclosed in a dot line. The white-level correction circuit 23 and the level variable circuit 23a operate basically similarly to the circuits of FIG. 4A.

As illustrated in FIG. 4A, the white-level correction circuit 23 includes a white-level memory 30 for holding a white level value. The white-level memory 30 holds a white level pattern (for a single line) as illustrated by dot-line waveforms in FIG. 4B, wherein the white level pattern is updated for each line. The white level value is converted into an analog signal by a D/A conversion circuit 31.

A voltage dividing circuit 34 is a circuit which enables controlling the voltage division ratio thereof through analog switches 34a The analog switches 34a are operated according to the value of controlling data output from the I/O port 29 of FIG. 3. A comparator 33 makes comparison between the magnitudes of two inputs having positive and negative values and outputs the result as a binary value of I/O. The white level value which is adjusted by the D/A conversion circuit 31 through the voltage dividing circuit 34 is input to the positive input terminal of the comparator 33. To the negative input terminal thereof, a video signal from the amplifier 18 of FIG. 3 is input.

A white-level algorism memory 32 includes a function table having address inputs which are the white-level value output from the white level memory 30 and the value I/O resulted from the comparison of the comparator 33 so that an updated value of the white level is read out therefrom as data based on a predetermined algorism. The data read from the white level algorism memory 32 is written into the white level memory 30 and is used as the white level for the next line.

Next there will be described the white-level adjusting operations for the CCD 16 and the CCD 17, using a flow chart of FIG. 5.

First, the output of the level variable circuit 22a for the surface scanner 201 is maximized (the analog switches 34a in FIG. 4A are all turned on) to maximize the white level output (S1).

Then, the surface scanner 201 is moved to a position P1 illustrated in FIG. 2, then the white reference member 402 as an exemplary standard white reference member is scanned by the CCD 16 (S2) and then the read data (image data) of the white reference member 402 is taken in the RAM 24 through the latch 26. As the white reference member 402, for example, a member having a known reflectivity of 80% is employed.

The CPU 28 obtained an average density value over a certain region of the image data of the white reference member 402 which is stored in the RAM 24 (S3). A certain region is utilized for the calculation because if there are dusts adhered thereto, this will extemporaneously cause bright portions or dark portions. Namely, such bright portions and dark portions out of the scanned density values are cut by a predetermined amount (band-pass filter) and sampling is performed over the certain region, which enables calculations less prone to being affected by the condition.

Based on the average value, the controlling data is calculated for white level adjustment in the level-variable circuit 22a of the white level correction circuit 22 (S4). For example, the white level adjusting value is determined to be 255×0.8-204, in the case where the average density value is the reflectivity (80%) of the white reference member 402 and the level variable circuit 22a has 256 tones (0 to 255). More specifically, the white level adjusting value is ON/OFF controlling data for the analog switches 34a to provide a proper voltage division ratio to the voltage dividing circuit 34 of FIG. 4A.

Then, the CPU 28 writes the determined white-level adjusting value into the EEPROM 28a and also performs white-level adjustment for the CCD 16 (S5).

Next, the surface scanner 201 is moved to the position P2 illustrated in FIG. 2 and the back-surface scanning roller 220 is scanned by the CCD 16 (S6). It is preferable that the back-surface scanning roller 220 is kept rotating at this time. The CPU 28 determines the average density value over a certain region, based on the image data of the back-surface scanning roller 220 which is stored in the RAM 24 (S7). Since the correction of the CCD 16 has been already performed using the white reference member 402, the average density obtained at this time is the density value of the back-surface scanning roller 220 and, thus, this average density is utilized as a target value α.

Next the output of the level variable circuit 23a for the back-surface scanner 301 is maximized (S8). Then, the back-surface scanning roller 220 is scanned by the CCD 17 on the back-surface scanner 301 (S9) and the read data (image data) of the back-surface scanning roller 220 is taken in the RAM 25 through the latch 27. It is preferable that the back-surface scanning roller 220 is kept rotating at this time.

The CPU 28 determines the average density value over a certain region based on the image data of the back-surface scanning roller 220 which is stored in the RAM 25 (S10). The average density is used as a target value $\beta$.

Then, from the target values $\alpha$ and $\beta$, an optimal white level adjusting value for the back-surface scanner 301 (S11) is obtained. More specifically, controlling data required for white level adjustment for the level variable circuit 23a is calculated such that the target value $\beta$ is in agreement with the target value $\alpha$.

Then, the CPU 28 writes the obtained white level adjusting value in the EEPROM 28a and performs white level adjustment for the CCD 17 (S12).

By scanning the back-surface scanning roller 220 as a single white reference member through the CCD 16 on the surface scanner 201 and the CCD 17 on the back-surface scanner 301 and adjusting the white levels as described above, it is possible to prevent the occurrence of density differences due to deviations of white-level adjustment during scanning the both sides of an original, with a simple structure without involving an increase of the cost.

Further, by adjusting, in advance, the white level of the CCD 16 of the surface scanner 201 using the standard white member (white reference member 402) which is less prone to receive contaminations from originals, it is possible to indirectly perform white level adjustment for the CCD 17 of the back-surface scanner 301 based on the standard white member, thereby enabling maintaining the accuracy of the white level for utilization across the years.

Other Embodiments

There will be described image scanning devices according to other embodiments of the present invention. The same portions as those of the aforementioned first embodiment will be designated by the same reference characters and description thereof will not be shown.

Figure 6:
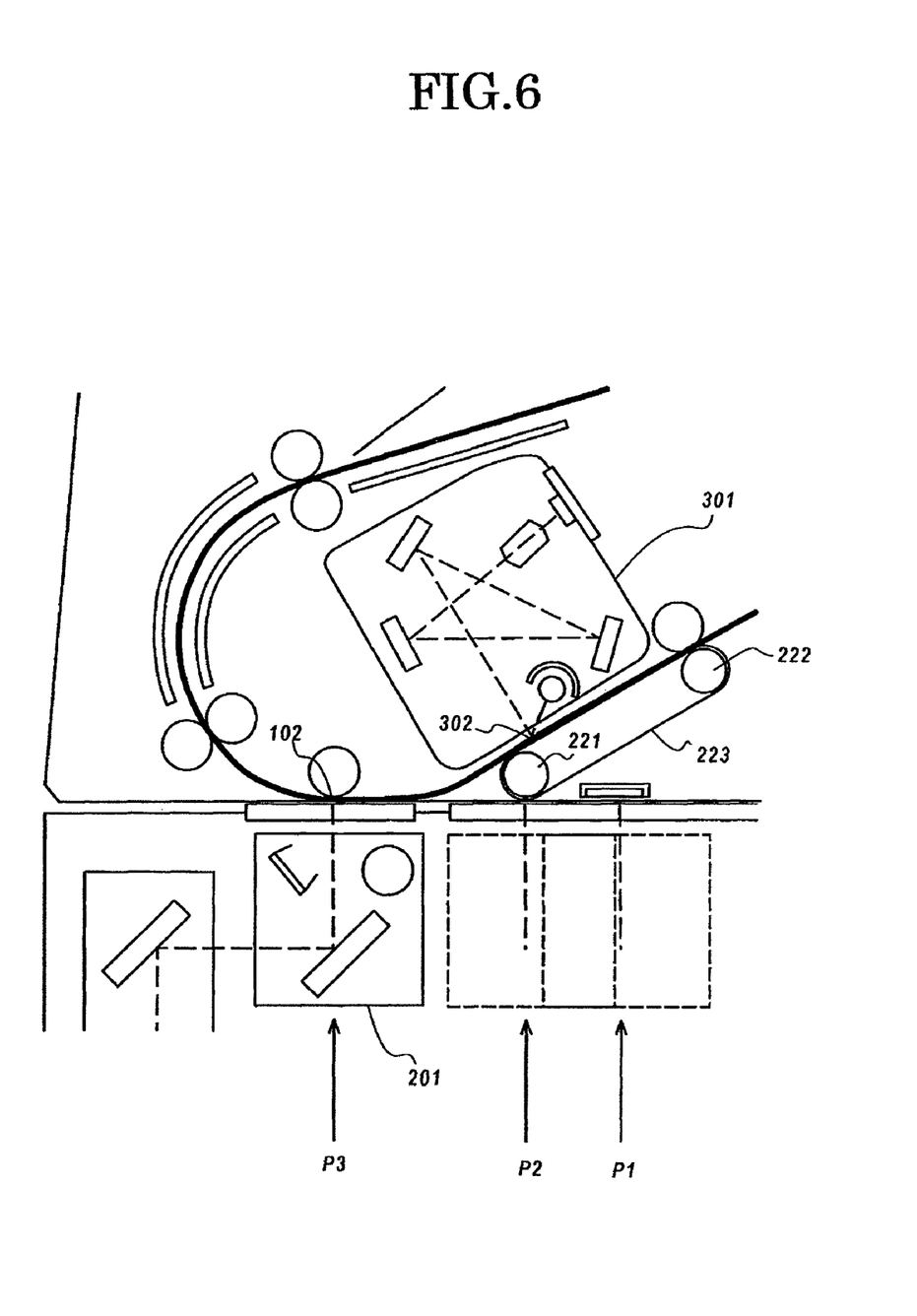
FIG. 6 is a main part enlarged view of a scanning part for explaining another embodiment.

In the aforementioned first embodiment, the back-surface scanning roller 220 which is a white reference member has been described as a roller. On the contrary, as illustrated in FIG. 6, a back-surface belt member 223 as a white reference member is placed such that it is faced to the back-surface scanner 301. The back-surface belt member 223 is a belt having a white-colored surface which is tightly stretched between a driving roller 222 and a stretching roller 221. With the aforementioned structure, it is possible to improve the capability for conveying originals at the back-surface scanning position 302, thereby reducing image deflections due to impacts during conveyance.

Further, while, in the aforementioned first embodiment, the surface scanning roller 120 is not utilized as a white reference member, it is also possible to eliminate the white reference member 402 and utilize the surface scanning roller 120 as a standard white member. This enables cost reduction due to the elimination of the white reference member 402.

Figure 7:
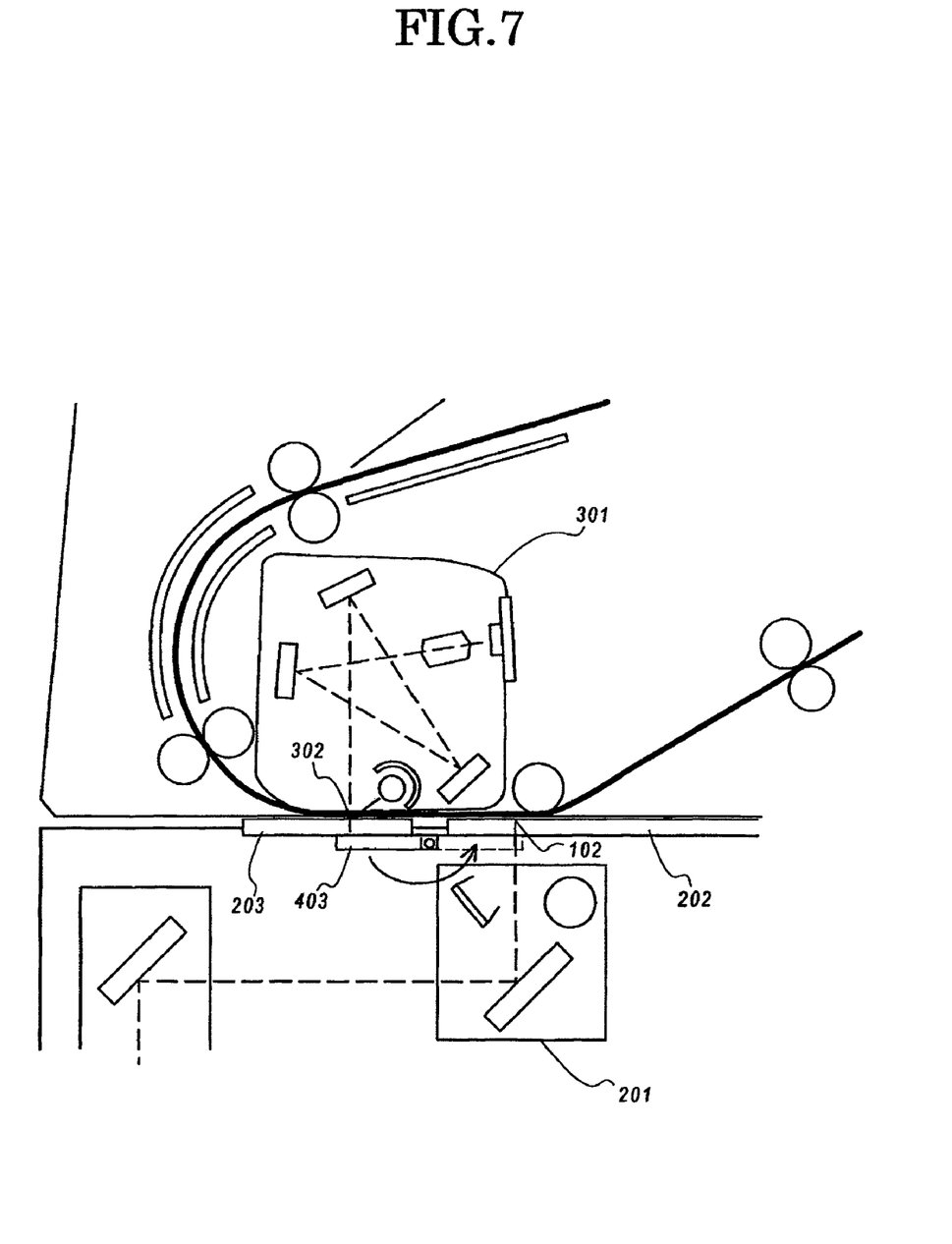
FIG. 7 is a main part enlarged view of a scanning part for explaining a further embodiment.

Further, in the aforementioned first embodiment, there has been described that the surface scanner 201 as a first scanning means is moved to scan the back-surface scanning roller 220 which is a single white reference member by both the surface scanner 201 and the back-surface scanner 301. However, it is also possible to configure the device such that the white reference member is moved for scanning the single white reference member by both the first and second scanning means. For example, as illustrated in FIG. 7, the white reference member 403 faced to the back-surface scanner 301 may be moved by being rotated and the surface thereof to be scanned by the back-surface scanner 301 can be also scanned by the surface scanner 201. This enables preventing the occurrence of density differences, similarly to in the first embodiment.

Further, in the structure according to the aforementioned first embodiment, the back-surface scanning roller 220 may be integrated and united with the back-surface scanner 301 (the lamp 304, the mirrors 306, 307 and 308, the lens unit 310 and the CCD 17), and the position of the back-surface scanning roller 220 with respect to the back-surface scanning position (the synchronizing position and the light path length from the CCD 17 to the back-surface roller 220) may be assembly-adjustable (the position is adjustable during assembling and securing). Further, the back-surface scanner 301 (including the back-surface scanning roller 220) is mounted in the ADF 100 such that it is swingable in such a direction that it recedes and approaches from and to the scanning device main body 200 and the back-surface scanning unit is positioned through biasing means and abutting means which are not shown such that the back-surface scanning roller 220 is at a predetermined distance from the platen glass 203. Further, the position at which the back-surface scanning roller 220 is scanned by the surface scanner 201 (the direction of movement of the surface scanner 201) is also made assembly-adjustable. This can cause the back-surface scanning roller 220 to be scanned at a proper light-path position and a proper synchronizing position with respect to the surface scanner 201 and the back-surface scanner 301, thereby further reducing the density difference between the surface and the back surface of an original.

Also, during scanning the back-surface scanning roller 220 by the surface scanner 201 and the back-surface scanner 301, the edges of the back-surface scanning roller 220 at its end portions in the axial direction may be detected and may be utilized for normalization of the scanning position in the direction perpendicular to the original conveyance direction. This enables scanning the same portion of the back-surface scanning roller 220 in the direction perpendicular to the original conveyance direction, thereby further reducing the density difference between the surface and the back surface of an original.

Further, while, in the aforementioned first embodiment, there has been described that the white level of the second scanning means is adjusted using a white-level adjusting value of the first scanning means, this is not always necessary. For example, the white-level adjustment for the second scanning means may be performed based on scanned values of the white reference member obtained from the second scanning means. In this case, similarly the white level adjustment for the first scanning means may be performed based on scanned values of the white reference member obtained from the first scanning means. Namely, in the case where the white reference member is scanned by one of them for adjusting the white level, the other one may be adjusted using the adjusted white level as a reference. Further, in the case where the first and second scanning means are individually subjected to white level adjustment it is possible to concurrently perform processing thereof, thereby providing advantages of speeding up of processing and simplification of the control. Accordingly, for example, the image scanning device may be configured such that the white reference member is usually scanned by the first and second scanning means for adjusting the respective white levels and, only when a particular mode (for example, "a high accuracy mode" and the like) is specified, the adjusting process according to the aforementioned first embodiment is performed.

With the aforementioned embodiments, it is possible to significantly reduce the difference in white-level adjustment between the first and second scanning means placed across the original conveyance path, thereby preventing the occurrence of density differences, with a simple structure without involving an increase of the cost.

CROSS REFERENCE TO RELATED APPLICATION

This application claims the benefit of priority from the prior Japanese Patent Application No. 2004374573 filed on Dec. 24, 2004 the entire contents of which are incorporated by reference herein.

What is claimed is:

1. An image scanning apparatus comprising:
a conveyance path configured to convey an original document;
a first scanning unit configured to scan a first face of the original document conveyed along said conveyance path at a first reading position; and
a second scanning unit configured to scan a second face of the original document conveyed along said conveyance path at a second reading position; and
a white reference member configured to revolve around an axis perpendicular to a conveying direction in which the original is conveyed along said conveyance path, said white reference member being used for adjusting the white levels of at least said second scanning unit;
wherein said first scanning unit is movable to a third reading position for reading the white reference member, different from the first reading position, and
wherein said white reference member is positioned between the second reading position and the third reading position.

2. The image scanning apparatus according to claim 1, wherein said first scanning unit scans said white reference member at a position corresponding to the second reading position in a state said white reference member revolves, and
wherein said second scanning unit scans said white reference member at the second reading position in a state said white reference member revolves.

3. The image scanning apparatus according to claim 1, wherein said white reference member is a roller member.

4. The image scanning apparatus according to claim 1, wherein said white reference member is a belt member.

5. The image scanning apparatus according to claim 1, wherein the white level adjustment for said second scanning unit is performed based on scanned values of said white reference member obtained from said second scanning unit.

6. The image scanning apparatus according to claim 5, wherein white level adjustment for said first scanning unit is performed based on read values of said white reference member obtained from said first scanning unit.

7. The image scanning apparatus according to claim 6, wherein a target value of the white level adjustment for said first scanning unit and a target value of the white level adjustment for said second scanning unit are set to be equal to each other.

8. The image scanning apparatus according to claim 1, further comprising a standard white reference member;
wherein said first scanning unit is movable at least to the first reading position, to the third reading position, and to a position for reading said standard white reference member.

9. An image forming apparatus comprising:
the scanning apparatus according to claim 1; and
an image forming unit for forming images on a sheet based on image data obtained by scanning the first face and the second face of the original document with the first scanning unit and the second scanning unit.

10. An image scanning apparatus comprising:
a conveyance path configured to convey an original document;
a first scanning unit configured to scan a first face of the original document conveyed along said conveyance path at a first reading position;
a second scanning unit configured to scan a second face of the original document conveyed along said conveyance path at a second reading position;
a white reference member configured to revolve around an axis perpendicular to a conveying direction in which the original is conveyed along said conveyance path, wherein the white reference member is located at a position facing to the second scanning unit; and
a white level adjustment unit configured to adjust scan data of the original document from the second scanning unit by using the white level adjustment data,
wherein the white level adjusting data is generated based on first data that the first scanning unit obtains by reading the rotating white reference member at a third reading position facing with the white reference member, and based on second data that the second scanning unit obtains by reading the rotating white reference member at the second reading position.

11. An image scanning apparatus comprising:
a conveyance path configured to convey an original document;
a first scanning unit configured to scan a first face of the original document conveyed along said conveyance path at a first reading position;
a second scanning unit configured to scan a second face of the original document conveyed along said conveyance path at a second reading position;
a first white reference member;
a second white reference member which disposed for facing the second scanning unit; and
a white level adjustment unit which adjusts first scan data of the first face of the original document from the first scanning unit by a first white level adjustment data, and which adjusts second scan data of the second face of the original document from the second scanning unit by a second white level adjustment data;
wherein the first white level adjustment data is generated from first reading data of the first white reference member by the first scanning unit, and
wherein the second white level adjustment data is generated from both second data obtained by correcting reading data of the second white reference member by the first scanning unit with the first white level adjusting data, and third reading data of the second white reference member by the second scanning unit.

* * * * *